(12) United States Patent
Brunneke et al.

(10) Patent No.: US 8,708,594 B2
(45) Date of Patent: Apr. 29, 2014

(54) MOTOR VEHICLE, PARTICULARLY COMMERCIAL VEHICLE, AND JOINT ARRANGEMENT

(75) Inventors: Hans-Gerd Brunneke, Georgsmarienhütte (DE); Christian Losche, Stemwede (DE)

(73) Assignee: ZF Friedrichshafen AG, Friedrichshafen (DE)

(*) Notice: Subject to any disclaimer, the term of this patent is extended or adjusted under 35 U.S.C. 154(b) by 272 days.

(21) Appl. No.: 13/002,430

(22) PCT Filed: Jun. 19, 2009

(86) PCT No.: PCT/DE2009/050034
§ 371 (c)(1),
(2), (4) Date: Jan. 14, 2011

(87) PCT Pub. No.: WO2010/000257
PCT Pub. Date: Jan. 7, 2010

(65) Prior Publication Data
US 2011/0123259 A1    May 26, 2011

(30) Foreign Application Priority Data

Jul. 4, 2008 (DE) .......................... 10 2008 040 183

(51) Int. Cl.
*F16C 11/00*    (2006.01)

(52) U.S. Cl.
USPC .. 403/131; 403/135; 280/93.511; 280/124.11

(58) Field of Classification Search
USPC ............... 403/57, 76, 90, 122, 123, 131, 135; 280/93.511, 124.11, 124.156
See application file for complete search history.

(56) References Cited

U.S. PATENT DOCUMENTS

| | | | |
|---|---|---|---|
| 3,780,282 A * | 12/1973 | Riley et al. ..................... | 362/540 |
| 4,124,257 A * | 11/1978 | Derner et al. ................. | 384/498 |
| 4,817,984 A | 4/1989 | Ferman et al. | |
| 6,109,630 A | 8/2000 | Dazy et al. | |
| 6,267,526 B1 | 7/2001 | McLaughlin | |
| 6,398,240 B1 * | 6/2002 | Taylor ....................... | 280/93.512 |
| 6,863,289 B2 * | 3/2005 | Buhl et al. ............. | 280/124.111 |
| 6,959,935 B2 | 11/2005 | Buhl et al. | |
| 7,221,265 B2 | 5/2007 | Bjorkgard | |
| 7,413,201 B2 * | 8/2008 | Freytag et al. ........... | 280/93.512 |
| 7,708,488 B2 | 5/2010 | Kunze et al. | |
| 8,038,162 B2 * | 10/2011 | Knopp et al. ............ | 280/93.511 |

(Continued)

FOREIGN PATENT DOCUMENTS

| | | | |
|---|---|---|---|
| DE | 44 20 489 A1 | 12/1995 | |
| DE | 100 31 454 A1 | 1/2001 | |

(Continued)

*Primary Examiner* — Gregory Binda
*Assistant Examiner* — Nahid Amiri
(74) *Attorney, Agent, or Firm* — Davis & Bujold, PLLC; Michael J. Bujold

(57) ABSTRACT

A joint arrangement (1) comprising a journal-like retaining body (5) and a joint head (4) is provided, at the axial head end thereof, for engaging with one of a one-piece or multi-piece supporting device. The base region (5a, 5b) of the retaining body (5) is connected to an axle body (10), particularly of a utility vehicle, and designed such that, in addition to the retaining body (5) extending in a journal-like manner, the joint arrangement (1) also comprises a separate flange body (8) which can be used to apply force to the retaining body (5) in the direction of the base region (5a, 5b) thereof for the purpose of connecting the retaining body (5) to the axle body (10).

9 Claims, 5 Drawing Sheets

(56) References Cited

U.S. PATENT DOCUMENTS

2005/0242539 A1* 11/2005 Matthew .................. 280/93.511
2006/0039748 A1* 2/2006 Ruhlander .................... 403/122
2007/0183841 A1* 8/2007 Kunze et al. .................. 403/131

FOREIGN PATENT DOCUMENTS

| DE | 102 19 708 A1 | 11/2003 |
| DE | 698 21 974 T2 | 12/2004 |
| DE | 10 2004 055 961 A1 | 5/2006 |
| DE | 11 2005 001 191 T5 | 9/2007 |
| JP | 9-24716 A | 1/1997 |
| WO | 2004/028839 A1 | 4/2004 |
| WO | 2005/080101 A1 | 9/2005 |
| WO | 2006/011049 A2 | 10/2006 |
| WO | WO 2008022620 A1 * | 2/2008 |

* cited by examiner

MOTOR VEHICLE, PARTICULARLY COMMERCIAL VEHICLE, AND JOINT ARRANGEMENT

This application is a National Stage completion of PCT/DE2009/050034 filed Jun. 19, 2009, which claims priority from German patent application serial no. 10 2008 040 183.8 filed Jul. 4, 2008.

FIELD OF THE INVENTION

The invention relates to joint arrangement comprising a journal-like retaining body for a utility vehicle having at least one axle body and a support thereof, and motor vehicle comprising a joint arrangement.

BACKGROUND OF THE INVENTION

It is known in regard to utility vehicles in particular to provide, in addition to the actual load-bearing axle suspension which absorbs the vertically acting weight of the axle, another support which comprises e.g. individual, obliquely extending connecting arms or an A-frame arm which engages via the tip thereof at a joint head carried by a journal-like retaining body, and is retained at the other end on longitudinal frame parts of the chassis. Such an A-frame arm can also provide lateral guidance for the axle body, for example.

An embodiment of a multi-piece A-frame arm is found in DE 102 19 708 A1, for example.

To movably support such connecting arms or similar connecting arms on the axle body, a journal-like retaining body is known, which, in the installed state, extends upwardly from the axle body, approximately in the region of the expanded differential housing thereof, and has a joint head at which the connecting arm or arms engage. This retaining body is often designed as a forged piece and is expanded in the manner of a flange in the base region thereof to enable connection above thereof to the axle body, often using threaded connections. This component, which is usually forged and is often also referred to as a journal flange, is highly stressed during vehicle operation. The flange-type base piece expansion results in a complicated design, however, in which the flange expansion extends approximately at a right angle to the journal axis. As such, it is very difficult to realize a fiber orientation in the material in the forging process that ensures that the fibers extend through the entire component and do not protrude anywhere along the extension thereof. The service life and safety margin of this component therefore differ greatly depending on the fiber orientation. Since such a component cannot be subjected to material testing in a non-destructive manner in regard to the fiber orientation, uncertainties arise regarding premature failure of the component.

SUMMARY OF THE INVENTION

The problem addressed by the invention is that of making an improvement here.

This problem is solved by the invention using joint arrangement comprising a journal-like retaining body for a motor vehicle, particularly a utility vehicle.

By way of the invention, the complexity of a one-piece retaining body with the flange-like expansion thereof is avoided in favor of a geometric simplification to at least two individual components. In the retaining body, which has now been simplified, the fibers can extend nearly parallel to one another and transversely to the main load direction.

To maximize stability, the retaining body is advantageously a forged piece in this case as well, wherein the simplified geometry thereof minimizes the uncertainties regarding the fiber orientation, greatly reduces the risk of failure, and greatly improves the service life.

Only relatively small mechanical loads will be placed on the flange body which is now separate. It can therefore be formed of another, non-forged material.

Particularly favorably, the retaining body, as the forged piece, comprises an only slight extension in the radial direction compared to the axial extension thereof, thereby resulting in an approximately cylindrical shape in which the fibers extend in a closely packed manner and approximately in parallel.

The retaining body does not require a separate flange region, but rather, advantageously, only a base region which is expanded relative to a shank region, onto which the flange body can be pressed in a holding-down manner e.g. onto a step or an oblique surface of the base region. The flange body can then be designed to be substantially planar using simple production engineering and, to ensure a good connection between retaining body and axle body, comprise a central through-hole for the retaining body and a stepped or conically expanding abutment region encircling the through-hole to press downward onto the expanded base region of the retaining body in a form locking manner. A reworking of the flange body, as is the case with forged pieces, can be omitted.

In particular, the multi-piece design, according to the invention, of retaining body and flange body makes it possible to provide a selection of mutually combinable retaining bodies and flange bodies, which can be used depending on the geometry of the axle body and/or the engaging support. For example, journals of different sizes can be retained using the same flange body. Or, depending on the axle body, flanges having different bore sizes or bore geometries can be used on the same journal body.

In addition, the retaining body can comprise an axial channel through which a threaded body can be inserted to clamp the journal to a joint on the top side for engagement with the A-frame arm, for example.

Despite the multi-piece design, the invention also makes it possible to easily prefabricate the outwardly extending retaining body and the flange body as one jointly installable component, thereby enabling them to be installed jointly. The amount of installation effort required therefore remains minimal.

BRIEF DESCRIPTION OF THE DRAWINGS

Further advantages and features of the invention result from the embodiments of the subject matter of the invention, which are depicted in the drawing and are described in the following.

In the drawings.

DETAILED DESCRIPTION OF THE PREFERRED EMBODIMENTS

Figure 1:
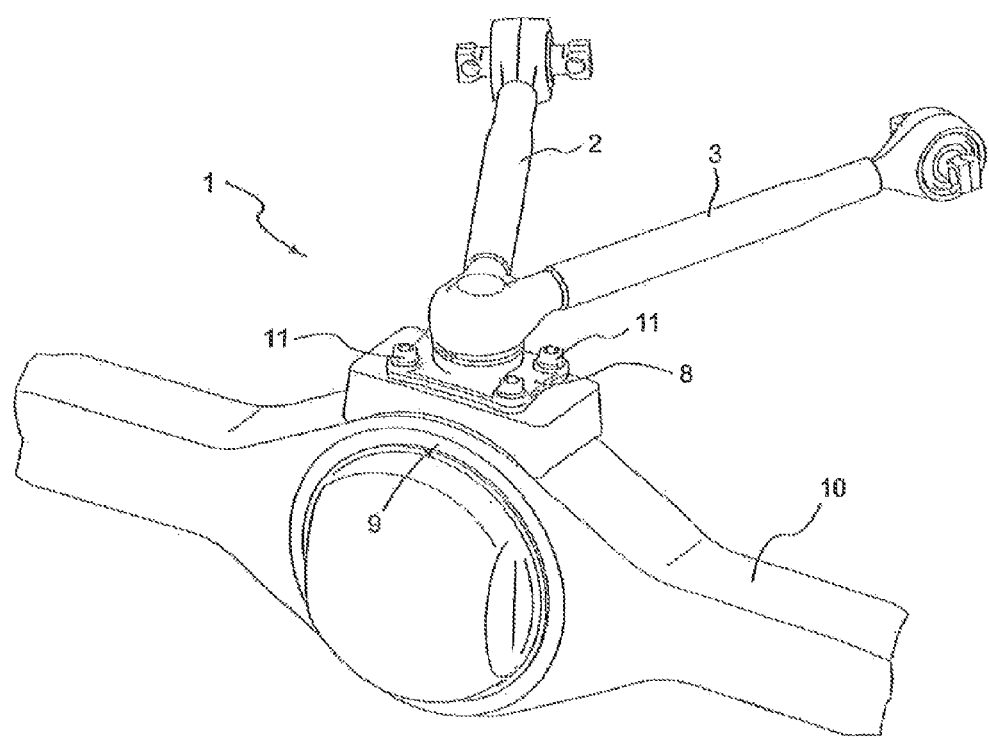
FIG. 1 shows a perspective and schematic section of a utility vehicle in the region of a joint arrangement for the connection of an axle body—a rear axle in this case—which is expanded in the differential region and comprises two connecting rods extending toward one another in the shape of a "V" as further support for the axle body, on the top side of which a retaining body is provided for connection to this support.
Figure 3:
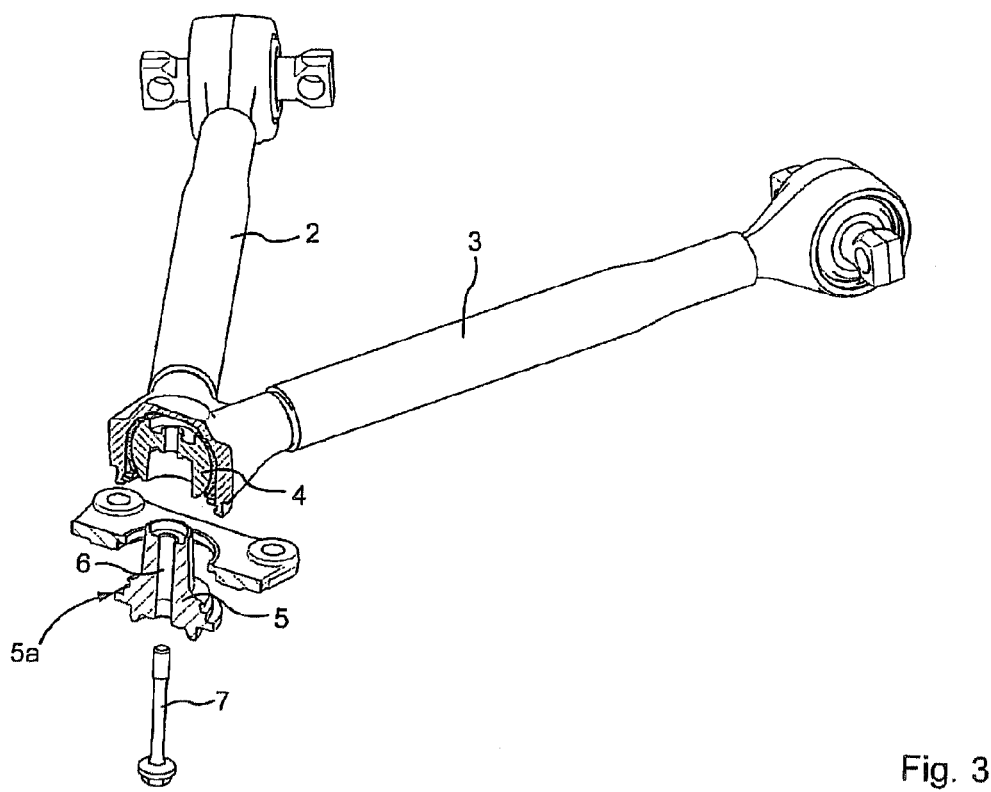
FIG. 3 shows the parts in FIG. 2 in an exploded view, before assembly.
Figure 2:
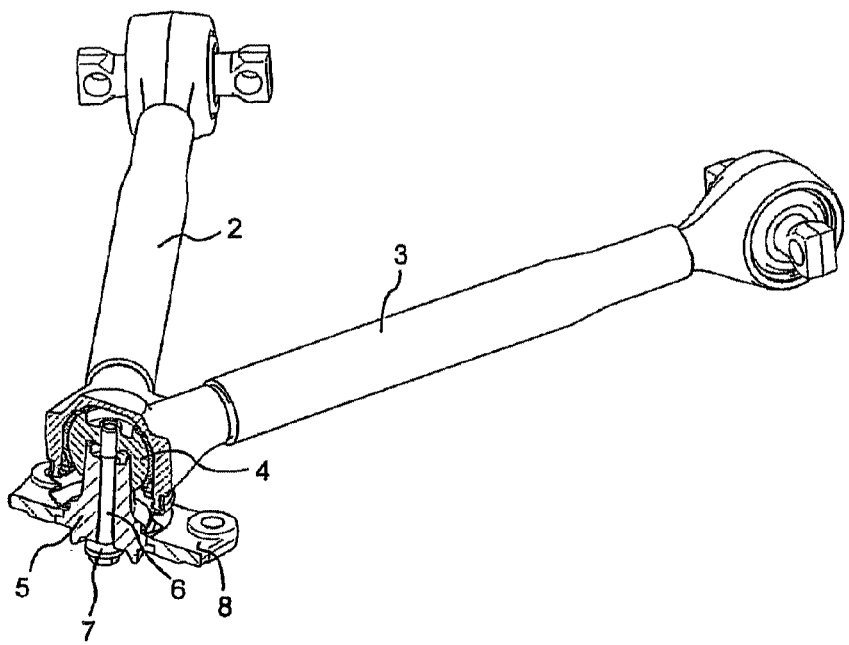
FIG. 2 shows a partially exposed detailed view of the retaining body and the flange body and the connection thereof to the connecting rods.
Figure 4:
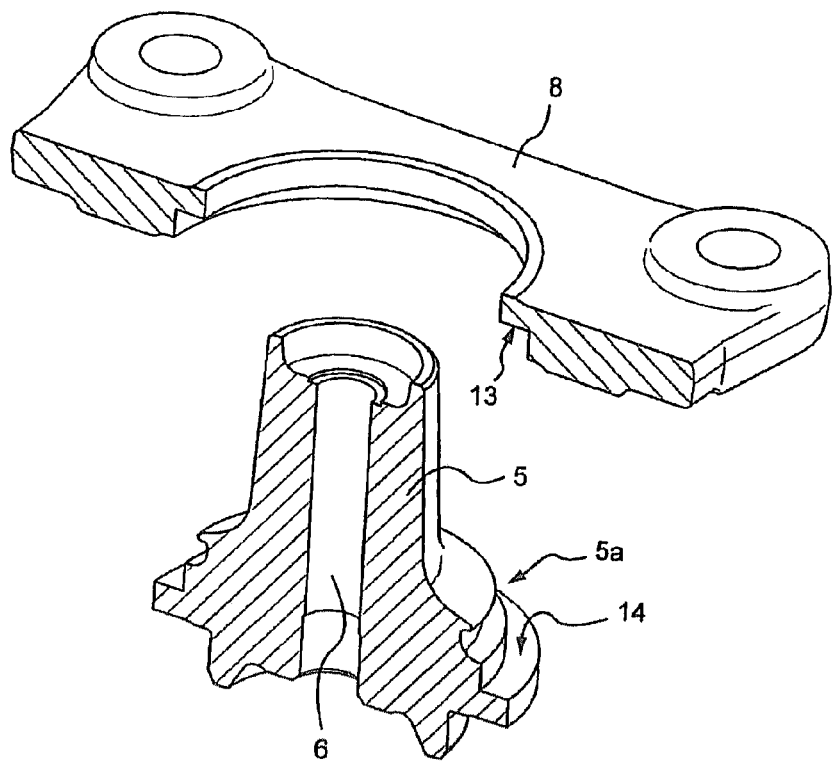
FIG. 4 shows an enlarged component drawing of the retaining body and the flange body, each of which has been cut longitudinally, before the assembly thereof.

The joint arrangement 1 shown in entirety in FIG. 1 comprises, among other things, two connecting rods 2, 3 which extend toward one another in an A-frame arm arrangement forming an acute angle and a "V" as viewed from above, a joint head 4 gripped thereby from above at the tip of the triangle and being secured in position on an upper axial end of a journal-like retaining body 5 using a screw 7 extending through an axial channel 6 in the retaining body, and a flange body 8 which is secured on an expanded region 9 of an axle body 10 using threaded connections 11, for example, or other retaining methods. Details of this arrangement 1 are also shown in FIGS. 2 and 3.

Figure 8:
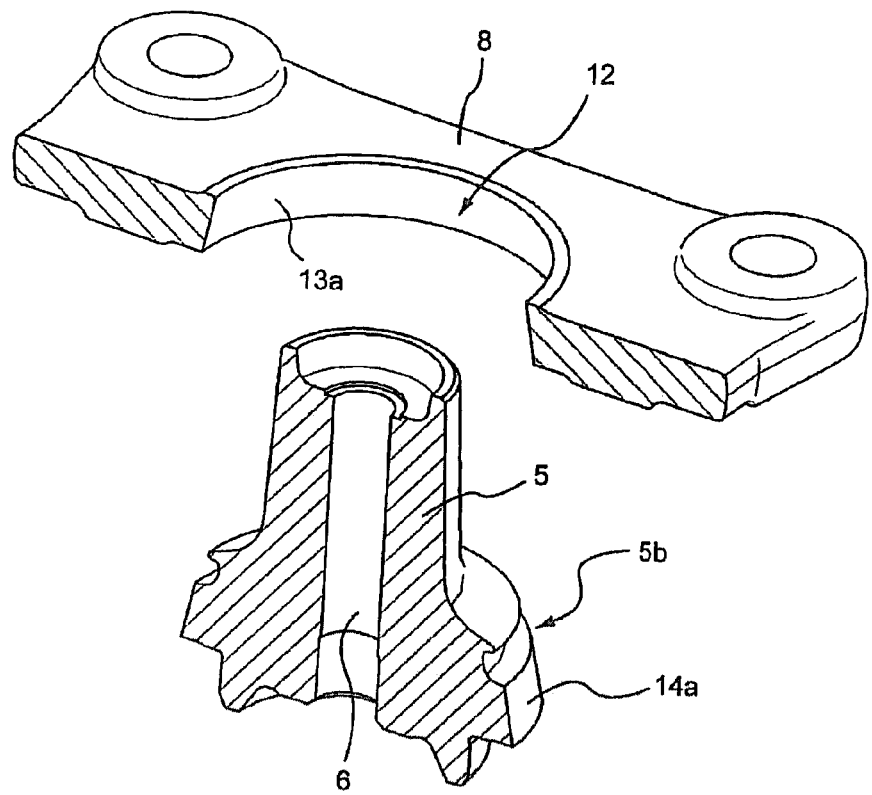
FIG. 8 shows an enlarged component drawing of a second embodiment of a retaining body and a flange body, each of which has been cut longitudinally, before the assembly thereof.

As shown in FIG. 1, the more or less planar flange body 8 applies a downwardly directed force which presses onto the axle body 10 when installed onto the expanded base region 5a (or onto the base region 5b in the second embodiment depicted in FIG. 8) of the journal-shaped retaining body 5.

Figure 5:
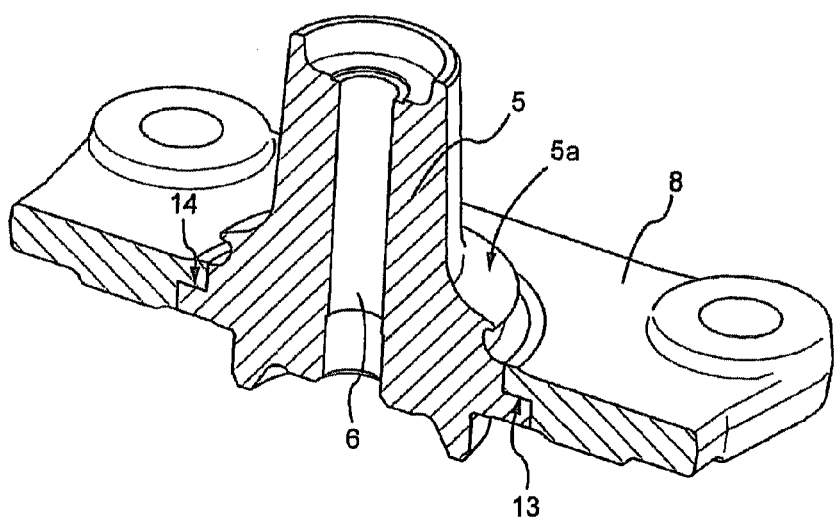
FIG. 5 shows a depiction similar to that shown in FIG. 4 after the parts have been pressed together to form a prefabricated unit.
Figure 9:
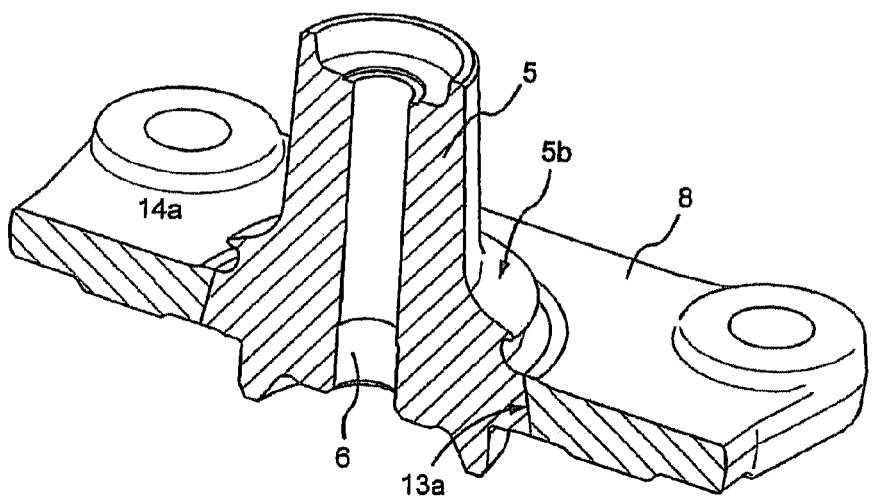
FIG. 9 shows a depiction similar to that shown in FIG. 8 after the parts have been pressed together to form a prefabricated unit.

The flange body 8 specifically comprises (see e.g. FIG. 6) a central through-hole 12 for the retaining body 5, and a stepped (alternatively a downwardly conically expanding opening is also possible, as shown in FIGS. 8 and 9) abutment region 13 which encloses the through-hole 12 for pressing onto a complementary abutment 14 of the base region 5a of the retaining body 5. The interplay of the single- or multi-stepped abutments 13, 14 is shown clearly in the partially exposed FIG. 2 or FIG. 5 for a first embodiment having stepped abutments 13, 14.

FIG. 8 shows an alternative version, according to which the edge of the central through-hole 12 of the flange 8, as the abutment region 13a, is expanded downwardly and conically around the circumference thereof, and can be pressed onto a complementary abutment 14a, which is also conically beveled, of the alternatively designed base region 5b of the retaining body 5. The parts 5 and 8 of this version are depicted in FIG. 9 in the force locking connected state thereof. In this case as well, the flange 8 placed onto the top applies an axially downwardly pressing, circumferentially securing force onto the retaining body 5.

A combination of stepped abutments 13, 14 and conical abutments 13a, 14a as well as further force locking and/or form locking combinations of abutments are possible. Rotational symmetry is not mandatory in this case.

The mechanical requirements on the separate flange body 8 are relatively low in both embodiments; for example, it can also be designed as a cast part or it can be made of different materials than the retaining body 5. For example, a simple steel or a fiber reinforced plastic may also be considered.

Figures 6, 6A:
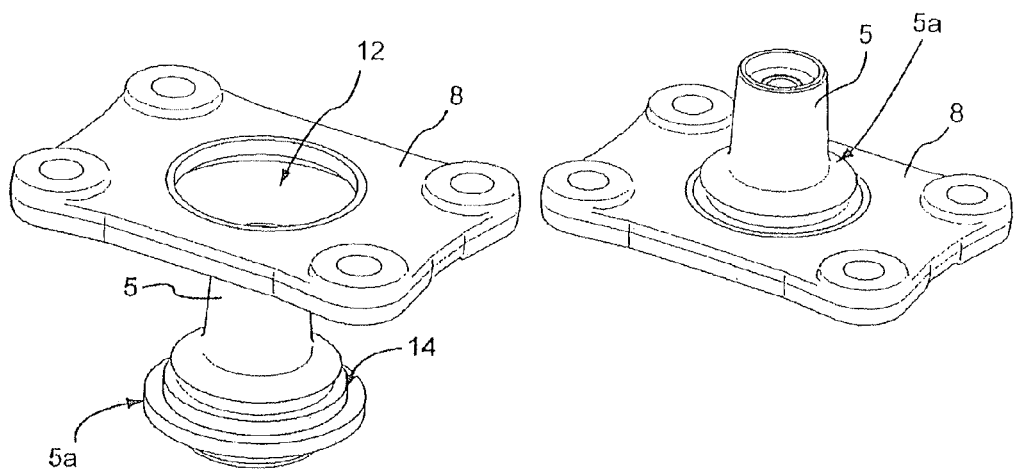
FIGS. 6 and 6A show a perspective depiction of a retaining body before and after the press-fit connection thereof to a substantially rectangular flange body.
Figures 7, 7A:
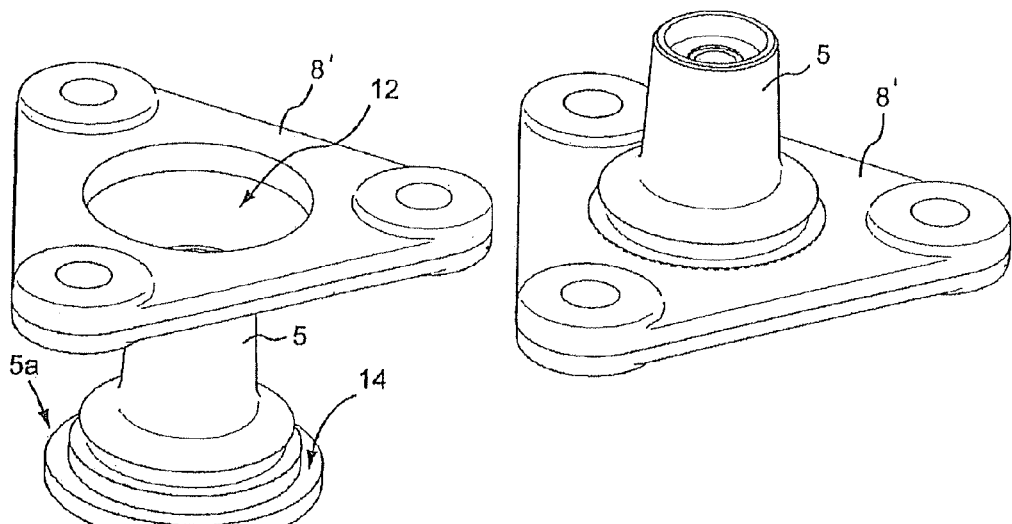
FIGS. 7 and 7A show a perspective depiction of the retaining body in FIG. 6 before and after the press-fit connection thereof to a substantially triangular flange body.

As shown in FIGS. 6 and 7 for the first embodiment, for example (this would also be possible with the second embodiment), the parts 5, 8 can be held against one another in a rotationally fixed press fit even before the installation thereof, thereby forming a prefabricated component which can be held against the axle body 10 simply by installing the threaded connections 11, precisely in the manner of a conventional, one-piece joint bolt.

In this case, an axle body 10 is understood to be any external part or housing part that includes an axle of the chassis, as shown in FIG. 1. In this case, the axle body 10 is expanded in the center region—relative to the vehicle transverse direction—in order to accommodate a differential. This expanded region is used to fix the joint arrangement 1 in position, thereby enabling the two connecting rods 2, 3 (supporting device), which provide support here, to be connected by load-bearing longitudinal frame parts, for example, even in the upper region. Such a supporting device is helpful in particular for ensuring good lateral guidance of the axle.

The base region 5a (or 5b in the second embodiment) of the retaining body 5 is in contact with the axle body 10 and is acted upon by force from the separate flange body downwardly in the direction of the axle body 10 via the threaded connections 11. FIGS. 6 and 7 show clearly that the flange body 8 itself can have a different design despite having the same retaining body 5, and, for example, can have a triangular shape 8' (FIG. 7) having three through-holes or a rectangular shape 8 (FIG. 6) having four through-holes.

Independently of the design of the flange body 8, the retaining body 5 can be a forged piece and, since the shape has now been simplified, can have a continuous fiber orientation with no additional expenditure, without the risk of the fibers protruding anywhere along the extension thereof and weakening the component.

This lateral protrusion of the fibers is also prevented by the fact that the forged piece, which according to the invention has been separated from the flange region, requires only a slight extension in the radial direction relative to the axial extension thereof and therefore tends to assume the shape of a cylinder. Forging such components is considerably simpler compared to conventional journals having a flange region integrally formed thereon as one piece. It is therefore possible to manufacture good-quality retaining bodies 5 according to the invention by forging and without special skills.

Base region 5a or 5b, which is expanded relative to the shank region, is expanded only slightly by comparison in the diameter thereof, and need not have a width dimension such that it can comprise bores for retaining screws, for example. It is sufficient, for example, to design one or two steps as abutments 14, to thereby enable the downward pressing and the force introduction of the flange body 8. This abutment 14 can be designed in particular such that it encircles the axis of the journal.

In addition to the aforementioned different flange bodies 8 for identical retaining bodies 5, it is also possible, as an alternative, for different retaining bodies 5 which have different shank lengths, for example, to be retained by identical flange bodies 8. In all, to ensure high flexibility, it is therefore possible to provide a selection of mutually combinable retaining bodies and flange bodies which can be used depending on the geometry of the axle body and/or the engaging support, and depending on the requirements.

List of Reference Characters
1 joint arrangement
2 connecting rod
3 connecting rod
4 joint head
5 retaining body
5a, 5b base region
6 channel
7 screw
8 flange body
9 expanded region
10 axle body
11 threaded connection
12 through-hole
13, 13a abutment
14, 14a abutment

The invention claimed is:

1. A joint arrangement (1) comprising a retaining body (5) that has an axial head end to which a joint head is fixed, the joint head (4) engages and supports a supporting device (2; 3),
the retaining body (5) has a base region that extends radially therefrom and is axially located opposite the head end and has a bottom facing surface and an abutment surface the retaining body is connectable to an axle body (10) of a utility vehicle, and
a flange body (8) comprising a bottom facing surface and a top facing surface and a through-hole that extends from the bottom facing surface to the top facing surface, the flange body has an abutment surface that defines a circumference of the through-hole, the flange body being connectable to the axle body such that when connected thereto and with the retaining body extending through the through-hole of the flange body, the bottom facing surface of the flange body abuts the axle body and the base region of the retaining body is sandwiched between the flange body and the axle body with the bottom facing surface of the base region of the retaining body abutting the axle body and the abutment surface of the base region of the retaining body abutting the abutment surface of the flange body, such that the retaining body is fixed to the axle body (10).

2. The joint arrangement (1) according to claim 1, wherein the flange body (8) is substantially planar and comprises either a stepped or conically expanding abutment region (13; 13a) that defines a perimeter of the through-hole (12), the abutment region of the flange body abuts an abutment (14; 14a) of the base region (5a; 5b) of the retaining body (5).

3. The joint arrangement (1) according to claim 1, wherein the retaining body (5) and the flange body (8) are prefabricated to form an integral component.

4. The joint arrangement (1) according to claim 3, wherein the flange body (8) is pressed onto the retaining body (5) to become integral with the retaining body (5) and prevent relative rotation.

5. A joint arrangement comprising:
an elongate retaining body having an axial through-bore and a first axial end, a joint head being fixed to the first axial end of the retaining body and the joint head pivotally supporting at least one chassis frame connecting arm, the retaining body comprises an annular periphery having a radially extending abutment surface;
a planar flange body having a through-hole, the through-hole of the flange body comprises an annular periphery having a radially extending abutment surface;
the planar flange body being connectable to an axle body to fix the retaining body in a secured position, the retaining body in the secured position extends through the through-hole of the flange body along an axis of the through-hole, the abutment surface of the flange body abuts the abutment surface of the retaining body and axially fixes the retaining body with respect to the flange body, when the flange body is connected to the axle body, the abutment surface of the flange body applies a clamping force on the abutment surface of the retaining body in a direction away the first axial end of the retaining body, the annular periphery of the retaining body mates with the annular periphery of the through-hole of the flange body such that the through-bore of the retaining body and the through-hole of the flange body are coaxially aligned.

6. The joint arrangement according to claim 5, wherein in the secured position, the retaining body extends completely through the flange body such that the first axial end of the retaining body is located on one side of the flange body and an opposite axial end of the retaining body is located on an opposite side of the flange body.

7. The joint arrangement according to claim 6, wherein the flange body is connected to and directly abuts the axle body.

8. The joint arrangement according to claim 7, wherein the annular periphery of the through-hole of the flange body radially surrounds the annular periphery of the retaining body.

9. The joint arrangement according to claim 8, wherein the at least one chassis frame connecting arm is an A-frame arm that comprises two connecting rods, the joint head pivotally supports the A-frame arm in relation to the axle body.

* * * * *